G. H. FERRIS.
Steam Cooking Apparatus.

No. 167,830. Patented Sept. 21, 1875.

Witnesses.
Ben J. Clark
W. M. Edwards

Inventor.
Geo. H. Ferris
By J. P. Fisher, his Atty.

N. PETERS, PHOTO-LITHOGRAPHER, WASHINGTON, D. C.

UNITED STATES PATENT OFFICE.

GEORGE H. FERRIS, OF BROOKLYN, NEW YORK.

IMPROVEMENT IN STEAM COOKING APPARATUS.

Specification forming part of Letters Patent No. 167,830, dated September 21, 1875; application filed November 1, 1873.

*To all whom it may concern:*

Be it known that I, GEORGE H. FERRIS, of Brooklyn, in the State of New York, have invented certain Improvements in Steam Cooking Apparatus; and I do hereby declare the following to be a full, clear, and exact description thereof, which will enable others skilled in the art to which it appertains to make and use the same, reference being had to the accompanying drawing forming part of this specification, in which—

Figure 1:
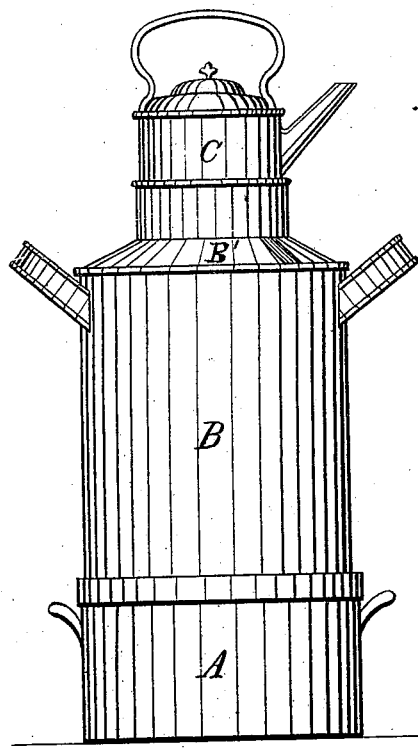
Figure 2:
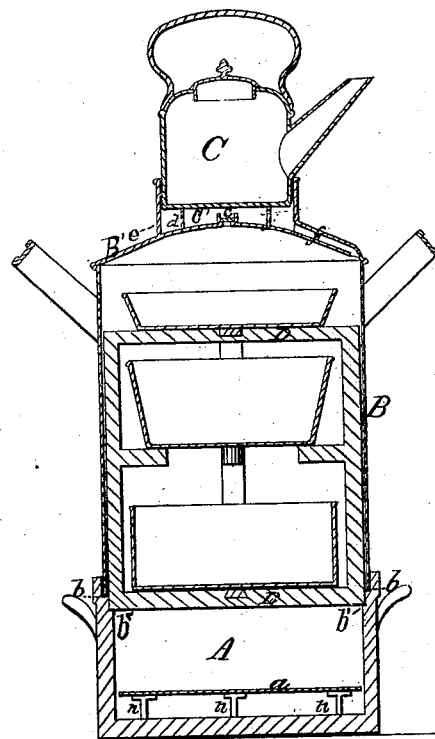
Figure 3:
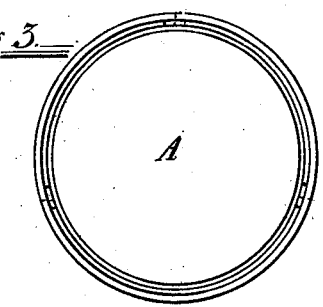
Figure 5:
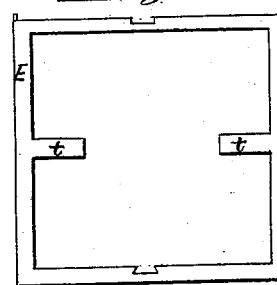
Figure 6:
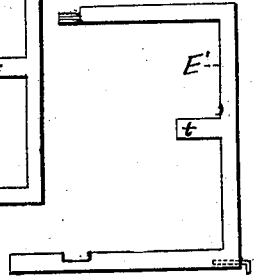
Figure 4:
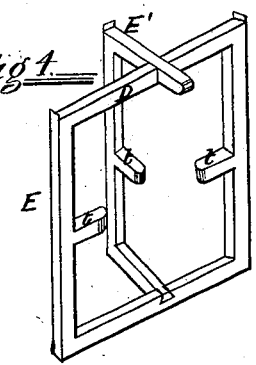

Figure 1 is an external side view of a steam cooking apparatus embodying my said invention. Fig. 2 is a vertical central section of the same. Fig. 3 is a top view of the boiler detached. Fig. 4 is a perspective view of the rack upon which the articles to be cooked are supported. Figs. 5 and 6 are side elevations of the two parts of the rack detached from each other.

Similar letters of reference indicate like parts in the several figures of the drawing.

My invention has for its object to provide a steam cooking apparatus adapted for cooking several kinds of articles at one and the same time, and in separate receptacles arranged within the case of the apparatus, and so that it consists in a rack employed in supporting the several receptacles, and, in combination with the rack, a boiler and steam-receiving case, within which the rack is secured, all so arranged as to allow the case to be lifted off the boiler and rack without disturbing the latter; also, in providing the cover of the case with an upward-projecting rim, a flange adapted to receive the lower extremity of a kettle or similar vessels, forming a steam-condensing chamber between the lower surface of the kettle and upper surface of the cover, all of which will be more fully understood by the following description and claims.

In the drawing, A represents the boiler forming the base of the apparatus proper. This boiler is made of sheet or cast metal, as may be preferred, and is provided at its upper end and inner periphery with ledges $b$ $b'$, as shown in Fig. 2. B is the steam-receiving case, which is made from any suitable sheet metal, and of any requisite height. This case is made open at its lower end, and its diameter is such as to fit closely into the upper end of the boiler, and to rest upon its upper surface of ledge $b$, forming a steam-tight joint. The upper end of this case is provided with a convexed cover, B', permanently attached thereto. Affixed to the upper surface of this cover is a rim, $e$, extending upward above the same. The diameter of this rim is such as to receive the kettle C or other similar vessel adapted to closely fit the same, the bottom of the kettle or vessel resting upon an upward-projecting flange or support, $d$, which is also permanently attached to the cover. The arrangement of this rim and flange is such as to form a chamber, C', between the upper surface of the cover and lower or bottom surface of the kettle or vessel when the latter is placed within or upon rim $e$. This chamber communicates with the interior of the case through an opening, $c$, formed in the center of the cover, and through a discharge-pipe, $f$, attached to the upper surface of the cover, and passing through the latter at its periphery, as shown in Fig. 2. The ascending steam as it is generated in the boiler flows through opening $c$ into the chamber and against the lower and cool surface of the kettle, which condenses the same, and the water therefrom passes through pipe $f$ back into the case, and runs down the inner side of the latter into the boiler, where it is again generated into steam. The object of this arrangement of chamber is to utilize the heat from the steam coming in contact with the cover, which would otherwise be lost, and at the same time to condense the steam, thus preventing it from passing off into the room. D is a cast-metal rack, which is adapted to fit loosely into the case, and so arranged as to rest upon the upper surface of ledge $b'$ and closely against the inner periphery of the boiler, as shown in Fig. 2. This rack is made in two parts, E and E', as shown in Figs. 5 and 6, which are locked or otherwise connected together, forming an open frame having three sides, as shown in Fig. 4. The inner surface of each of the uprights of this rack is provided with a series of lugs, $t$, projecting inward, slightly toward the center of the case forming shelves, on which a portion of the receptacles containing the articles to be cooked are supported. The arrangement of this rack is such as to allow the case to be lifted off the boiler without removing the rack, the object of which is to allow the receptacles to be placed upon the shelves or to be removed therefrom, when desired, without disturbing or removing the boiler from the stove. Loosely secured within the boiler, and resting upon supports $n\ n\ n$, is a removable bottom, $a$, on which articles may be placed when but a small quantity of water is used in the boiler.

My invention is used in the following manner: A suitable quantity of water is first placed in the boiler, and the articles to be cooked arranged in the several receptacles. The latter are then placed upon the shelves, when the case is adjusted to its position and the boiler set upon the stove over the opening. As the steam is generated in the boiler, it ascends, filling the case which cooks the articles in the several receptacles, and as the steam flows through opening $c$ in the cover the water in the kettle is heated while the condensed steam returns through pipe $f$ into the boiler.

It will be observed that the shelves $t\ t$ of the rack only project inward slightly toward the center of the case, the object of which is to leave the center of the case unobstructed, so as to admit of introducing large articles, which would not pass between the shelves if they extended across the entire area of the case, which is often found necessary.

Having thus described my invention, what I claim, and desire to secure by Letters Patent, is—

1. The rack D, made in two parts, E E′, locked or otherwise connected together, and provided with the shelves $t\ t$, extending inward to form a support for the edges of the separate receptacles, as specified.

2. In combination with rack D, the case B and boiler A, the latter provided with the ledges $b\ b'$, adapted to receive the lower end of the rack and case, as specified.

3. In combination with cover B′, the rim $e$, adapted to form a steam-condensing chamber, C′, between the lower surface of the kettle and upper surface of the cover, and communicating with the interior of the case through opening $c$ and pipe $f$, as specified.

G. H. FERRIS.

Witnesses:
   B. S. CLARK,
   B. GOODKIND.